US012568531B2

(12) United States Patent
Liu et al.

(10) Patent No.: US 12,568,531 B2
(45) Date of Patent: Mar. 3, 2026

(54) SENDING AND CONFIGURING MESSAGING IN A RANDOM ACCESS PROCEDURE

(71) Applicant: ZTE CORPORATION, Guangdong (CN)

(72) Inventors: Kun Liu, Guangdong (CN); Bo Dai, Guangdong (CN); Xiubin Sha, Guangdong (CN); Huiying Fang, Guangdong (CN); Weiwei Yang, Guangdong (CN); Luanjian Bian, Guangdong (CN); Youjun Hu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 568 days.

(21) Appl. No.: 17/290,515

(22) PCT Filed: Oct. 31, 2019

(86) PCT No.: PCT/CN2019/114809
§ 371 (c)(1),
(2) Date: Apr. 30, 2021

(87) PCT Pub. No.: WO2020/088606
PCT Pub. Date: May 7, 2020

(65) Prior Publication Data
US 2021/0385870 A1      Dec. 9, 2021

(30) Foreign Application Priority Data
Nov. 1, 2018    (CN) ........................ 201811296298.X

(51) Int. Cl.
*H04W 74/0833*          (2024.01)
*H04W 74/0838*          (2024.01)

(52) U.S. Cl.
CPC .... *H04W 74/0833* (2013.01); *H04W 74/0838* (2024.01)

(58) Field of Classification Search
CPC . H04W 74/0833; H04W 4/70; H04W 74/004; H04W 24/10; H04W 72/1268;
(Continued)

(56) References Cited

U.S. PATENT DOCUMENTS

2015/0156798 A1      6/2015   Jiang et al.
2016/0081101 A1      3/2016   Yu
(Continued)

FOREIGN PATENT DOCUMENTS

CN          101132618  A      2/2008
CN          103974445  A      8/2014
(Continued)

OTHER PUBLICATIONS

Samsung, "Discussion on Quality report in Msg3 for MTC", 3GPP TSG RAN WG1 Meeting #94bis, R1-1810823, Oct. 8-12, 2018 (Year: 2018).*
(Continued)

*Primary Examiner* — Thinh D Tran
(74) *Attorney, Agent, or Firm* — KDW FIRM PLLC

(57)          ABSTRACT

Disclosed are a message sending method and device, a message configuration method and device, and a storage medium. The message sending method includes: a terminal sends first information in a message 3 in a random access procedure, where the first information includes channel quality information; and the terminal determines second information according to a type of the message 3.

17 Claims, 3 Drawing Sheets

A base station triggers a random access procedure through a physical downlink control channel (PDCCH) order, where the PDCCH order includes at least one of following information: indication information that a reporting function of channel quality information in a message 3 of the random access procedure is enabled or disabled; a type of the channel quality information reported in the message 3; or a carrier or a carrier index corresponding to the channel quality information reported in the message 3

~ S302

(58) Field of Classification Search
    CPC .......................... H04W 76/27; H04W 74/0838;
                H04L 5/0091; H04L 1/00; H04L 1/0026;
                H04L 1/0031; H04L 1/1887; H04L 1/189;
                                                    H04L 5/0053
    See application file for complete search history.

(56) References Cited

U.S. PATENT DOCUMENTS

| | | | |
|---|---|---|---|
| 2017/0231011 | A1 | 8/2017 | Park et al. |
| 2018/0324869 | A1* | 11/2018 | Phuyal .................. H04W 72/23 |
| 2019/0104553 | A1* | 4/2019 | Johansson ......... H04W 74/0833 |
| 2019/0159260 | A1* | 5/2019 | Charbit ................ H04W 88/06 |
| 2019/0342800 | A1* | 11/2019 | Sirotkin ............... H04B 17/318 |
| 2020/0383119 | A1* | 12/2020 | Sun ......................... G16Y 10/75 |
| 2021/0076244 | A1* | 3/2021 | Tie ........................... H04L 1/189 |
| 2021/0219166 | A1* | 7/2021 | Morozov ................ H04L 1/203 |
| 2021/0227507 | A1* | 7/2021 | Wang .................... H04W 24/10 |
| 2021/0282191 | A1* | 9/2021 | Chang .................. H04W 24/10 |

FOREIGN PATENT DOCUMENTS

| | | |
|---|---|---|
| CN | 104812084 A | 7/2015 |
| CN | 107926034 A | 4/2018 |
| CN | 108702784 A | 10/2018 |
| EP | 3337273 A1 | 6/2018 |
| KR | 20080039294 | 5/2008 |

OTHER PUBLICATIONS

First Search Report dated Aug. 15, 2022, for Chinese Patent Application No. 201811296298.X (six (6) pages).

Notice of First Review Opinion dated Aug. 30, 2022, for Chinese Patent Application No. 201811296298.X (16 pages).

Request for Submission of an Opinion dated Jun. 30, 2022, for Korean Patent Application No. 10-2021-7016760 (13 pages).

Ericsson, "Downlink Channel Quality reporting in MSG3 in NB-IoT", 3GPP TSG-RAN2 Meeting #102 R2-1807749 Busan, South Korea, May 21-25, 2018.

Ericsson, "Support of quality report in Msg3 in LTE-MTC", 3GPP TSG-RAN WG1 Meeting #94bis Tdoc R1-1810189 Chengdu, China, Oct. 8-12, 2018.

International Search Report for the International Patent Application No. PCT/CN2019/114809, mailed Jan. 23, 2020, 2 pages.

* cited by examiner

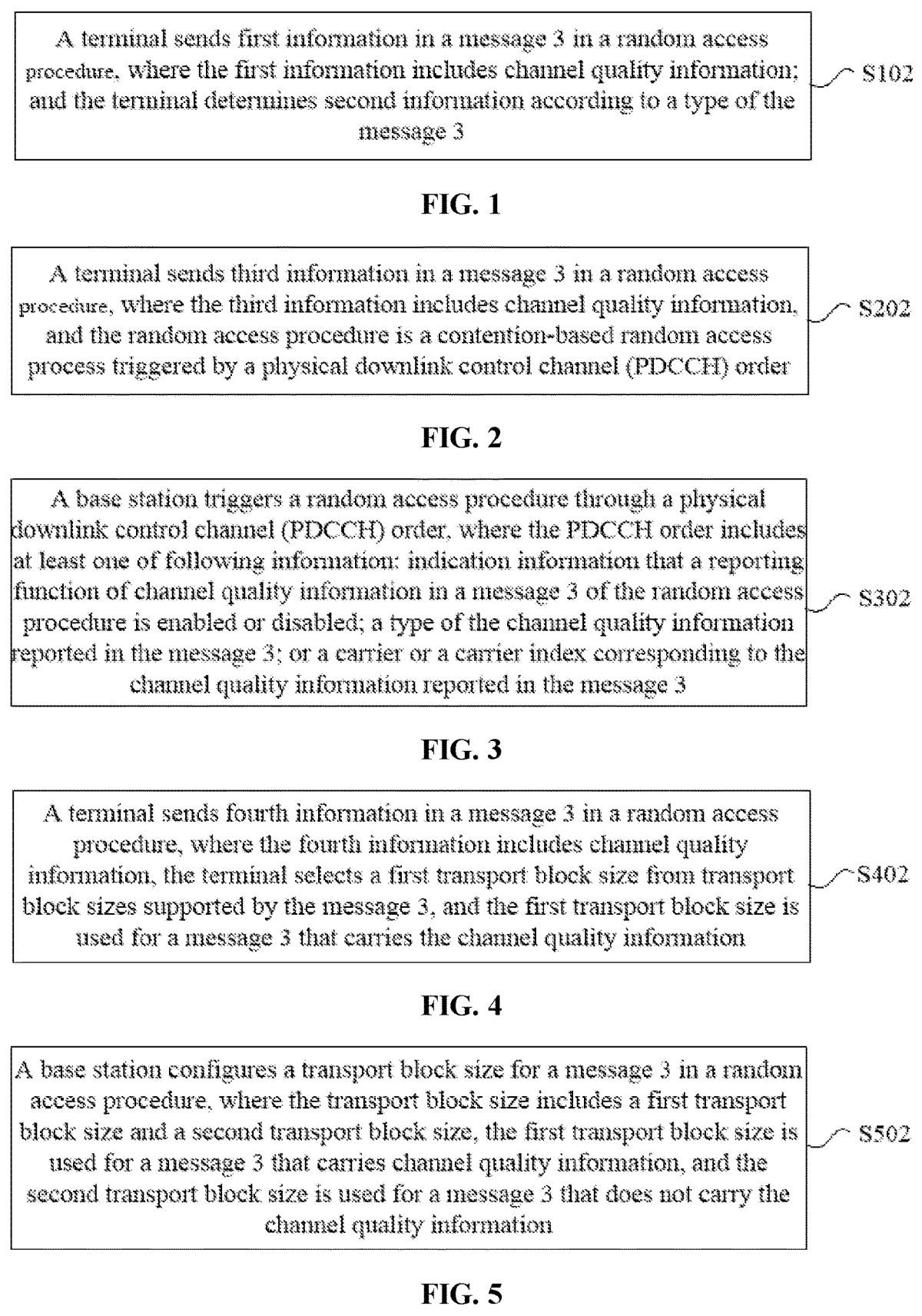

A terminal sends first information in a message 3 in a random access procedure, where the first information includes channel quality information; and the terminal determines second information according to a type of the message 3 ⌐ S102

FIG. 1

A terminal sends third information in a message 3 in a random access procedure, where the third information includes channel quality information, and the random access procedure is a contention-based random access process triggered by a physical downlink control channel (PDCCH) order ⌐ S202

FIG. 2

A base station triggers a random access procedure through a physical downlink control channel (PDCCH) order, where the PDCCH order includes at least one of following information: indication information that a reporting function of channel quality information in a message 3 of the random access procedure is enabled or disabled; a type of the channel quality information reported in the message 3; or a carrier or a carrier index corresponding to the channel quality information reported in the message 3 ⌐ S302

FIG. 3

A terminal sends fourth information in a message 3 in a random access procedure, where the fourth information includes channel quality information, the terminal selects a first transport block size from transport block sizes supported by the message 3, and the first transport block size is used for a message 3 that carries the channel quality information ⌐ S402

FIG. 4

A base station configures a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information ⌐ S502

FIG. 5

SENDING AND CONFIGURING MESSAGING IN A RANDOM ACCESS PROCEDURE

CROSS-REFERENCE TO RELATED APPLICATIONS

This is a National Stage Application filed under 35 U.S.C. 371 based on International Patent Application No. PCT/CN2019/114809, filed on Oct. 31, 2019, which claims priority to Chinese Patent Application No. 201811296298.X filed on Nov. 1, 2018, disclosures of both of which are incorporated herein by reference in their entireties.

TECHNICAL FIELD

The present application relates to the field of communications, and for example to a message sending method and device, a message configuration method and device, and a storage medium.

BACKGROUND

A machine type communication (MTC) user terminal (UE), also referred to as a machine-to-machine (M2M) user terminal, is a main application form of Internet of Things at the present stage. The cellular-based Narrow Band Internet of Things (NB-IoT) technology is an important subject of a 3rd Generation Partnership Project (3GPP) Release 13, and its corresponding related content of the 3GPP protocol has been approved by the Random Access Network (RAN) plenary meeting.

After a UE of the NB-IoT sends a random access signal (also referred to as a Message 1, i.e., Msg1) on a Narrow Band Physical Random Access Channel (NPRACH) of a NB-IoT system, a Random Access Response (RAR) (also referred to as a Message 2, i.e., Msg2) sent by a base station is received. Scheduling information of the RAR is included in downlink control information (DCI) and is sent through a Narrow Band Physical Downlink Control Channel (NPDCCH).

The UE immediately enables a contention resolution timer after a message 3 (Msg3) is sent (and then the timer is restarted for every retransmission of the Msg3), and the UE needs to monitor a message 4 (Msg4) returned to the UE by the base station within this time. After the UE successfully receives the Msg4 sent by the base station, the UE sends a Radio Resource Control Connection Setup Complete (RRC ConnectionSetupComplete) message or an RRC Connection Resume Complete (RRC ConnectionResumeComplete) message to the base station so as to inform the base station, and each of the two messages is called a Msg5.

After the UE of the NB-IoT receives a RAR message, the obtains uplink time alignment and an uplink resource. However, at this time, it cannot be determined that the RAR message is sent to the UE instead of other UEs because there is a possibility that different UEs send a same random access sequence on a same time-frequency resource, so that the UEs receive a same RAR message through a same Random Access-Radio Network Temporary Identifier (RA-RNTI). Moreover, the UE does not have to know whether other UEs are using a same resource for random access. Therefore, the UE needs to resolve such random access contention by the subsequent Msg3 and Msg4, in order to distinguish between different UEs, one UE-specific ID will be carried in the Msg3 for distinguishing between different UEs.

Since multiple coverage enhancement levels are supported in the NB-IoT system, uplink channels or downlink channels with different coverage enhancement levels adopt different repetition times. The UE of the NB-IoT determines a coverage enhancement level and selects a corresponding random access channel for sending the Msg1 according to the determined coverage enhancement level. A number of retransmission times of messages (e.g., Msg2, Msg3, Msg4 and scheduling information of the above messages) involved in a subsequent random access procedure is determined by the coverage enhancement level selected by the UE. Because the UE may only measure downlink channel quality information, when a matching degree of an uplink channel quality and a downlink channel quality is very low; the selection of the number of retransmission times of the uplink channels Msg1 and Msg3 is deviated, so that the Msg1 and the Msg3 cannot be successfully transmitted or the Msg1 and the Msg3 occupy excessive resources for transmission to cause certain resource waste. Meanwhile, the UE of the NB-IoT does not feedback the downlink channel quality information to the base station, so that the number of retransmission times of the downlink channels (such as the Msg2, the Msg4, and scheduling information of the above messages) cannot be flexibly adjusted by the base station, and if the number of retransmission times of the downlink channels selected by the base station is too large, the resource may also be waste in a certain degree.

SUMMARY

Embodiments of the present disclosure provide a message sending method and device, a message configuration method and device, and a storage medium.

According to an embodiment of the present disclosure, a message sending method is provided. The message sending method includes that a terminal sends first information in a message 3 in a random access procedure, where the first information includes channel quality information; and the terminal determines second information according to a type of the message 3.

According to another embodiment of the present disclosure, a message sending method is further provided. The message sending method includes that a terminal sends third information in a message 3 in a random access procedure, where the third information includes channel quality information, and the random access procedure is a contention-based random access procedure triggered by a physical downlink control channel (PDCCH) order.

According to another embodiment of the present disclosure, a message configuration method is further provided. The message configuration method includes that a base station triggers a random access procedure through a physical downlink control channel (PDCCH) order, where the PDCCH order includes at least one of: indication information that a reporting function of channel quality information in a message 3 of the random access procedure is enabled or disabled; a type of the channel quality information reported in the message 3; or a carrier or a carrier index corresponding to the channel quality information reported in the message 3.

According to another embodiment of the present disclosure, a message sending method is further provided. The message sending method includes that a terminal sends fourth information in a message 3 in a random access procedure, where the fourth information includes channel quality information, the terminal selects a first transport block size from transport block sizes supported by the message 3, and the first transport block size is used for a message 3 that carries the channel quality information.

According to another embodiment of the present disclosure, a message configuration method is further provided. The message configuration method includes that a base station configures a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information.

According to another embodiment of the present disclosure, a message sending device is further provided. The message sending device is applied to a terminal and includes a first sending module. The first sending module is configured to send first information in a message 3 in a random access procedure and determine second information according to a type of the message 3, where the first information includes channel quality information.

According to another embodiment of the present disclosure, a message sending device is further provided. The message sending device is applied to a terminal and includes a second sending module. The second sending module is configured to send third information in a message 3 in a random access procedure, where the third information includes channel quality information, and the random access procedure is a contention-based random access procedure triggered by a physical downlink control channel (PDCCH) order.

According to another embodiment of the present disclosure, a message configuration device is further provided. The message configuration device is applied to a terminal and includes a trigger module. The trigger module is configured to trigger a random access procedure through a physical downlink control channel (PDCCH) order, where the PDCCH order includes at least one of: indication information that a reporting function of channel quality information in a message 3 of the random access procedure is enabled or disabled; a type of the channel quality information reported in the message 3; or a carrier or a carrier index corresponding to the channel quality information reported in the message 3.

According to another embodiment of the present disclosure, a message sending device is further provided. The message sending device is applied to a terminal and include a third sending module. The third sending module is configured to send fourth information in a message 3 in a random access procedure, where the fourth information includes channel quality information, the terminal selects a first transport block size from transport block sizes supported by the message 3, and the first transport block size is used for a message 3 that carries the channel quality information.

According to another embodiment of the present disclosure, a message configuration device is further provided. The message configuration device is applied to a base station and includes a configuration module. The configuration module is configured to configure a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information.

According to another embodiment of the present disclosure, a storage medium is further provided. The storage medium stores a computer program, where the computer program is configured to, when executed, perform any of the message sending methods described above, or any of the message configuration methods described above.

According to the present disclosure, the terminal sends the first information in the message 3 in the random access procedure, where the first information includes the channel quality information; and the terminal determines the second information according to the type of the message 3. The second information includes at least one of: the type of the channel quality information; or the carrier corresponding to the channel quality information.

BRIEF DESCRIPTION OF DRAWINGS

The accompanying drawings presented herein are intended to provide a further understanding of the present disclosure, form a part of the present application, and illustrative embodiments of the present disclosure and descriptions thereof serve to explain the present disclosure and do not constitute a limitation of the present disclosure. In the drawings:

FIG. 1 is a flowchart of a messaging sending method according to an embodiment of the present disclosure;

FIG. 2 is another flowchart of a message sending method according to an embodiment of the present disclosure:

FIG. 3 is a flowchart of a message configuration method according to an embodiment of the present disclosure:

FIG. 4 is yet another flowchart of a message sending method according to an embodiment of the present disclosure:

FIG. 5 is yet another flowchart of a message configuration method according to an embodiment of the present disclosure:

DETAILED DESCRIPTION

Figure 6:
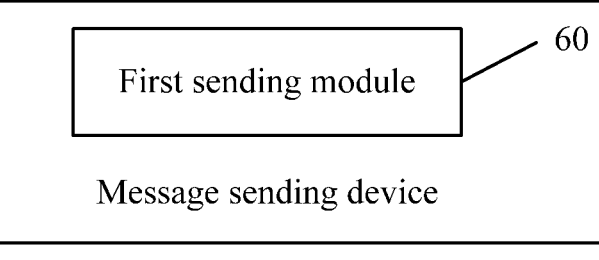
FIG. 6 is a structural block diagram of a message sending device according to an embodiment of the present disclosure.

The present disclosure will be described in detail hereinafter with reference to the accompanying drawings and in conjunction with embodiments. It should be noted that embodiments of the present application and features of the embodiments may be combined with each other without conflict.

It should be noted that the terms "first," "second," and the like in the Description and claims of the present disclosure and in the foregoing drawings are used for distinguishing between similar objects and not necessarily for describing a particular sequential or chronological order.

Embodiment 1

This embodiment provides a message sending method. FIG. 1 is a flowchart of a messaging sending method according to an embodiment of the present disclosure, as shown in FIG. 1, and the process includes following steps.

In S102, a terminal sends first information in a message 3 in a random access procedure, where the first information includes channel quality information; and the terminal determines second information according to a type of the message 3.

Through each of the above steps, the terminal sends the first information in the message 3 in the random access procedure, where the first information includes the channel quality information; and the terminal determines the second information according to the type of the message 3. The second information includes at least one of: a type of the channel quality information; or a carrier corresponding to the channel quality information.

In the embodiments of the present disclosure, the second message includes at least one of: the type of the channel quality information, or the carrier corresponding to the channel quality information. The type of the message 3 includes at least one of: a type 1: the message 3 carries uplink data; or a type 2: the message 3 does not carry the uplink data.

In the embodiments of the present disclosure, when the type of the message 3 is the type 1, the type of the channel quality information at least includes one of: a number of retransmission times of a control channel, or an aggregation level of a control channel; or the type of the channel quality information includes a number of retransmission times of a downlink data channel.

In the embodiments of the present disclosure, the carrier corresponding to the channel quality information is configured by the base station, or the carrier corresponding to the channel quality information is a carrier configured by default, or the carrier corresponding to the channel quality information is selected according to a first principle.

In the embodiments of the present disclosure, the step in which the carrier corresponding to the channel quality information is selected according to the first principle includes: M carriers are selected from a first set as the carrier corresponding to the channel quality information, where the first set includes at least one carrier, and the at least one carrier in the first set satisfies: the at least one carrier in the first set is a carrier among carriers in a second set and with channel quality information greater than or equal to a threshold, where the threshold is configured by the base station or is configured by default, and M is a positive integer.

It should be noted that, the message 3 in the above embodiment is not only applicable in a NB-IoT system, but also applicable in other wireless communication systems (for example, a long term evolution (LTE) system, a MTC system, and a new radio (NR) system of 5G), and the carrier corresponding to the channel quality information may be understood as a position of a central frequency point of the carrier, or an index of the carrier.

In the embodiments of the present disclosure, the carriers in the second set are configured by the base station or determined by the terminal.

At least one of the number of retransmission times of the control channel or the aggregation level of the control channel needs to satisfy following condition: a block error rate (BLER) is less than or equal to a first preset threshold.

The number of retransmission times of the downlink data channel needs to satisfy following condition: the block error rate (BLER) is less than or equal to a second preset threshold.

In the embodiments of the present disclosure, when the carrier corresponding to the channel quality information is configured by the base station, a number of carrier configured by the base station is at least 1.

In the embodiments of the present disclosure, the carrier configured by the base station at least includes a carrier used for transmitting random access response information; or the carrier used for transmitting the random access response information is in configured by default, and other carriers other than the carrier used for transmitting the random access response information are configured through the base station.

In the embodiments of the present disclosure, when the type of the message 3 is the type 2, the step in which the terminal determines the second information according to the type of the message 3 includes: the terminal determines the second information according to a format of the message 3.

In the embodiments of the present disclosure, when the format of the message 3 is a radio resource control (RRC) connection resume request or an RRC connection reestablishment request, the type of the channel quality information at least includes one of: a number of retransmission times of a control channel, or an aggregation level of a control channel; or the type of the channel quality information includes a number of retransmission times of a downlink data channel.

In the embodiments of the present disclosure, at least one of the number of retransmission times of the control channel or the aggregation level of the control channel needs to satisfy following condition: the block error rate (BLER) is less than or equal to a third preset threshold value; and the number of retransmission times of the downlink data channel needs to satisfy following condition: the block error rate (BLER) is less than or equal to a fourth preset threshold.

In the embodiments of the present disclosure, the carrier corresponding to the channel quality information is the carrier used for transmitting the random access response information.

Embodiment 2

This embodiment provides a message sending method. FIG. 2 is another flowchart of a message sending method according to an embodiment of the present disclosure, as shown in FIG. 2, and the process includes following steps.

In step S202, a terminal sends third information in a message 3 in a random access procedure, where the third information includes channel quality information, and the random access procedure is a contention-based random access procedure triggered by a physical downlink control channel (PDCCH) order.

Through each of the above steps, the terminal sends the third information in the message 3 in the random access procedure, where the third information includes the channel quality information; and the random access procedure is the contention-based random access procedure triggered by the physical downlink control channel (PDCCH) order.

In the embodiments of the present disclosure, the PDCCH order includes at least one of:

1) indication information for the third information enabling or disabling a reporting function of the channel quality information;

2) a type of the channel quality information; or 3) a carrier or a carrier index corresponding to the channel quality information.

In the embodiments of the present disclosure, the carrier corresponding to the channel quality information is a carrier where the PDCCH order is located upon sending the PDCCH order.

In the embodiments of the present disclosure, the carrier or the carrier index corresponding to the channel quality information is an interval between the carrier index corresponding to the channel quality information and a carrier index where the PDCCH order is located upon sending the PDCCH order.

For example, when "the carrier or the carrier index corresponding to the channel quality information" indicated in the PDCCH order is "+1", it represents that the carrier index corresponding to the channel quality information=the carrier index where the PDCCH order is located upon sending the PDCCH order+1.

For example, when "the carrier or the carrier index corresponding to the channel quality information" indicated in the PDCCH order is "−1", it represents that the carrier index corresponding to the channel quality information=the carrier index where the PDCCH order is located upon sending the PDCCH order−1.

In the embodiments of the present disclosure, the type of the channel quality information at least includes one of: a number of retransmission times of a control channel, or an aggregation level of a control channel; and/or the type of the channel quality information includes a number of retransmission times of a downlink data channel.

The carrier corresponding to the channel quality information is determined by one of: the carrier index where the PDCCH order is located upon sending the PDCCH order; or a carrier configured by the base station.

Embodiment 3

This embodiment provides a message configuration method. FIG. 3 is a flowchart of a message configuration method according to an embodiment of the present disclosure, as shown in FIG. 3, and the process includes following steps.

In S302, a base station triggers a random access procedure through a physical downlink control channel (PDCCH) order, where the PDCCH order includes at least one of following information:

indication information that a reporting function of channel quality information in a message 3 of the random access procedure is enabled or disabled; a type of the channel quality information reported in the message 3; or a carrier or a carrier index corresponding to the channel quality information reported in the message 3.

Through each of the above steps, the base station triggers the random access procedure through the physical downlink control channel (PDCCH) order, and the PDCCH order includes at least one of the following information: the indication information that the reporting function of the channel quality information in the message 3 of the random access procedure is enabled or disabled; the type of the channel quality information reported in the message 3; or the carrier or the carrier index corresponding to the channel quality information reported in the message 3.

Embodiment 4

This embodiment provides a message sending method. FIG. 4 is yet another flowchart of a message sending method according to an embodiment of the present disclosure, as shown in FIG. 4, and the process includes following steps.

In step S402, a terminal sends fourth information in a message 3 in a random access procedure, where the fourth information includes channel quality information, the terminal selects a first transport block size from transport block sizes supported by the message 3, and the first transport block size is used for a message 3 that carries the channel quality information.

Through each of the above steps, the terminal sends the fourth information in the message 3 in the random access procedure, the fourth information includes the channel quality information, and the terminal selects the first transport block size from the transport block sizes supported by the message 3, and the first transport block size is used for the message 3 that carries the channel quality information.

In the embodiments of the present disclosure, the transport block sizes supported by the message 3 further include a second transport block size, where the second transport block size is used for a message 3 that does not carry the channel quality information.

In the embodiments of the present disclosure, when a first condition is satisfied, a type of the channel quality information included in the fourth information is a channel quality indicator (CQI), where the first condition includes that a number of retransmission times of a control channel is less than or equal to a threshold; where the threshold is configured by a base station and sent to the terminal, or is configured by default.

In the embodiments of the present disclosure, when a second condition is satisfied, a type of the channel quality information included in the fourth information includes one of: a CQI and a number of retransmission times of a control channel; a CQI and an aggregation level of a control channel; a CQI, a number of retransmission times of a control channel, and an aggregation level of the control channel; a CQI and a number of retransmission times of a downlink data channel; a number of retransmission times of a control channel; an aggregation level of a control channel; a number of retransmission times of a control channel and an aggregation level of the control channel; or a number of retransmission times of a downlink data channel.

In the embodiments of the present disclosure, the second condition includes that the number of retransmission times of the control channel is greater than or equal to a threshold; where the threshold is configured by a base station and sent to the terminal, or is configured by default.

Embodiment 5

This embodiment provides a message configuration method. FIG. 5 is yet another flowchart of a message configuration method according to an embodiment of the present disclosure, as shown in FIG. 5, and the process includes following steps.

In step S502, a base station configures a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information.

Through each of the above steps, the base station configures the transport block size for the message 3 in the random access procedure, where the transport block size includes the first transport block size and the second transport block size, the first transport block size is used for the message 3 that carries channel quality information, and the second transport block size is used for the message 3 that does not carry the channel quality information.

It should be noted that the message 3 in the above embodiments 1 to 5 is a message that is based on uplink scheduling and is transmitted on a narrow band physical uplink shared channel (NPUSCH) using a hybrid automatic repeat request (HARQ) mechanism. The RRC Connection Request message or the RRC Connection Resume Request message is transmitted in the message 3, and if different UEs receive a same RAR message, then the different UEs will obtain a same uplink resource and send the message 3 simultaneously.

Embodiment 6

An embodiment of the present disclosure further provides a message configuration method. The message configuration method includes: a base station sends a first message to a terminal, where the first message includes a Cell Radio Network Temporary Identifier (C-RNTI) allocated to the terminal.

The first message is an RRC message, and the first message includes at least one of: RRC ConnectionSetup; RRC ConnectionResume; RRC ConnectionReconfiguration; RRC ConnectionReestablishmenta RRC EarlyDataTransmissionComplete, which is used for confirming that an Early Data Transmission (EDT) procedure is completed successfully, and further, this EDT procedure may be a control plane EDT procedure; or RRC ConnectionRelease.

Further, the first message is used for converting the terminal from a data transmission state using a preconfigured dedicated resource in a RRC idle state or a RRC idle mode to a RRC connection state.

Based on the above technical schemes, when the base station configures, for the terminal, the dedicated preconfigured resource used for transmitting data in the RRC idle state (RRC_IDLE), C-RNTI information of the terminal may be stored. However, the C-RNTI cannot be valid all the time in the RRC idle state, namely, the C-RNTI is valid timely, that is to say, the C-RNTI is valid only at a certain specific moment or a specific time period; and after this moment or this time period, the C-RNTI may be allocated to other terminals for use.

When the base station instructs the terminal which uses the dedicated preconfigured resource to transmit data in the RRC idle state (RRC_IDLE) to enter the RRC connection state (RRC_CONNECTED), if the C-RNTI is not valid at this time, then the base station needs to reallocate the C-RNTI to the terminal so as to avoid C-RNTI contention of different terminals within a same cell.

In the existing NB-IoT and MTC systems, the C-RNTI may only be sent to the terminal through a Msg2 or a Mobility ControlInfo (which is a channel element used for inter-cell switching contained in RRC connection reconfiguration information in an RRC connection state), and the C-RNTI cannot be configured or reconfigured for the terminal through other information. Therefore, in order to support the terminal which uses the dedicated preconfigured resource to transmit the data in the RRC idle state (RRC_IDLE) to enter the RRC connection state (RRC_CONNECTED), the base station may reallocate the C-RNTI to the terminal, and the base station needs to add a C-RNTI channel element in a downlink RRC message. The downlink RRC message includes at least one of: RRC Connection Setup; RRC ConnectionResume; RRC ConnectionReconfiguration; RRC ConnectionReestablishment; a RRC Early DataComplete; or a RRC ConnectionRelease.

Through the description of the above embodiments, those skilled in the art may clearly understand that the method according to the above embodiments may be implemented by means of software plus a necessary universal hardware platform, and of course, may also be implemented by hardware, but in many cases the former is a better implementation mode. Based on this understanding, the technical scheme of the present disclosure, either essentially or in terms of contributions to the related art, may be embodied in the form of a software product, which is stored in a storage medium (such as a ROM/RAM, a magnetic disk, an optical disc), and includes several instructions for causing a terminal device (which may be a mobile phone, a computer, a server, or a network device, etc.) to perform the methods described in the embodiments of the present disclosure.

Embodiment 7

This embodiment further provides a message sending device. The message sending device is applied to a terminal and used for implementing the above embodiments and optional implementation modes, and the description of the device that has been already made is omitted. The term "module" as used below; may implement a combination of at least one of software and hardware with a predetermined function. While the device described in following embodiments is preferably implemented in software, implementations of hardware, or a combination of software and hardware, are also possible and contemplated.

FIG. 6 is a structural block diagram of a message sending device according to an embodiment of the present disclosure, as shown in FIG. 6, the message sending device includes a first sending module 60. The first sending module 60 is configured to send first information in a message 3 in a random access procedure and determine second information according to a type of the message 3, where the first information includes channel quality information.

Through the above modules, the first information is sent in the message 3 in the random access procedure, where the first information includes the channel quality information; and the terminal determines the second information according to the type of the message 3. The second information includes at least one of: a type of the channel quality information; or a carrier corresponding to the channel quality information.

In the embodiments of the present disclosure, the second information includes at least one of: the type of the channel quality information, or the carrier corresponding to the channel quality information. The type of the message 3 includes at least one of: a type 1: the message 3 carries uplink data; or a type 2: the message 3 does not carry the uplink data.

In the embodiments of the present disclosure, when the type of the message 3 is the type 1, the type of the channel quality information at least includes one of: a number of retransmission times of a control channel, or an aggregation level of a control channel; or the type of the channel quality information includes a number of retransmission times of a downlink data channel.

In the embodiments of the present disclosure, the carrier corresponding to the channel quality information is configured by the base station, or the carrier corresponding to the channel quality information is a carrier configured by default, or the carrier corresponding to the channel quality information is selected according to a first principle.

In the embodiments of the present disclosure, the step in which the carrier corresponding to the channel quality information is selected according to the first principle includes: M carriers are selected from a first set as the carrier corresponding to the channel quality information, where the first set includes at least one carrier, and the at least one carrier in the first set satisfies: the at least one carrier in the first set is a carriers among carriers in a second set and with channel quality information greater than or equal to a threshold, where the threshold is configured by the base station or configured by default, and M is a positive integer.

It should be noted that, the message 3 in the above embodiment is not only applicable in a NB-IoT system, but also applicable in other wireless communication systems (for example, a long term evolution (LTE) system, a MTC system, and a new radio (NR) system of 5G), and the carrier corresponding to the channel quality information may be understood as a position of a central frequency point of the carrier, or an index of the carrier.

In the embodiments of the present disclosure, the carriers in the second set are configured by the base station or determined by the terminal.

At least one of the number of retransmission times of the control channel or the aggregation level of the control channel needs to satisfy following condition: a block error rate (BLER) is less than or equal to a first preset threshold.

The number of retransmission times of the downlink data channel needs to satisfy following condition: the block error rate (BLER) is less than or equal to a second preset threshold.

In the embodiments of the present disclosure, when the carrier corresponding to the channel quality information is configured by the base station, a number of carrier configured by the base station is at least 1.

In the embodiments of the present disclosure, the carrier configured by the base station at least includes a carrier used for transmitting random access response information; or the carrier used for transmitting the random access response information is in default configuration, and other carriers except the carrier used for transmitting the random access response information are configured through the base station.

In the embodiments of the present disclosure, when the type of the message 3 is the type 2, the step in which the terminal determines the second information according to the type of the message 3 includes: the terminal determines the second information according to a format of the message 3.

In the embodiments of the present disclosure, when the format of the message 3 is a RRC connection resume request or an RRC connection reestablishment request, the type of the channel quality information at least includes one of: a number of retransmission times of a control channel, or an aggregation level of a control channel; or the type of the channel quality information includes a number of retransmission times of a downlink data channel.

In the embodiments of the present disclosure, at least one of the number of retransmission times of the control channel or the aggregation level of the control channel needs to satisfy following condition: the block error rate (BLER) is less than or equal to a third preset threshold value; and the number of retransmission times of the downlink data channel needs to satisfy following condition: the block error rate (BLER) is less than or equal to a fourth preset threshold.

In the embodiments of the present disclosure, the carrier corresponding to the channel quality information is the carrier used for transmitting the random access response information.

Embodiment 8

This embodiment further provides a message sending device. The message sending device is applied to a terminal and used for implementing the above embodiments and optional implementation modes, and the description of the device that has been already made is omitted. The term "module" as used below; may implement a combination of at least one of software and hardware with a predetermined function. While the device described in following embodiments is preferably implemented in software, implementations of hardware, or a combination of software and hardware, are also possible and contemplated.

Figure 7:
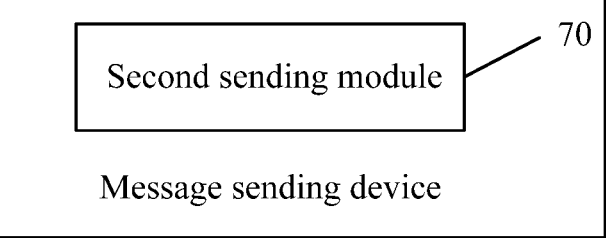
FIG. 7 is another structural block diagram of a message sending device according to an embodiment of the present disclosure.

FIG. 7 is another structural block diagram of a message sending device according to an embodiment of the present disclosure, as shown in FIG. 7, the message sending device includes a second sending module 70. The second sending module 70 is configured to send third information in a message 3 in a random access procedure, where the third information includes channel quality information, and the random access procedure is a contention-based random access procedure triggered by a physical downlink control channel (PDCCH) order.

Through the above modules, the first information is sent in the message 3 in the random access procedure, where the first information includes the channel quality information, and the random access procedure is the contention-based random access procedure triggered by the physical downlink control channel (PDCCH) order.

In the embodiments of the present disclosure, the PDCCH order includes at least one of:

1) indication information for the third information enabling or disabling a reporting function of the channel quality information;

2) a type of the channel quality information; or 3) a carrier or a carrier index corresponding to the channel quality information.

In the embodiments of the present disclosure, the carrier corresponding to the channel quality information is a carrier where the PDCCH order is located upon sending the PDCCH order.

In the embodiments of the present disclosure, the carrier or the carrier index corresponding to the channel quality information is an interval between the carrier index corresponding to the channel quality information and a carrier index where the PDCCH order is located upon sending the PDCCH order.

For example, when "the carrier or the carrier index corresponding to the channel quality information" indicated in the PDCCH order is "+1", it represents that the carrier index corresponding to the channel quality information=the carrier index where the PDCCH order is located upon sending the PDCCH order+1.

For example, when "the carrier or the carrier index corresponding to the channel quality information" indicated in the PDCCH order is "−1", it represents that the carrier index corresponding to the channel quality information=the carrier index where the PDCCH order is located upon sending the PDCCH order−1.

In the embodiments of the present disclosure, the type of the channel quality information at least includes one of: a number of retransmission times of a control channel, or an aggregation level of a control channel; and/or the type of the channel quality information includes a number of retransmission times of a downlink data channel.

The carrier corresponding to the channel quality information is determined by one of: the carrier index where the PDCCH order is located upon sending the PDCCH order; or a carrier configured by the base station.

Embodiment 9

This embodiment further provides a message configuration device. The message configuration device is applied to a terminal and used for implementing the above embodiments and optional implementation modes, and the description of the device that has been already made is omitted. The term "module" as used below; may implement a combination of at least one of software and hardware with a predetermined function. While the device described in following embodiments is preferably implemented in software, implementations of hardware, or a combination of software and hardware, are also possible and contemplated.

Figure 8:
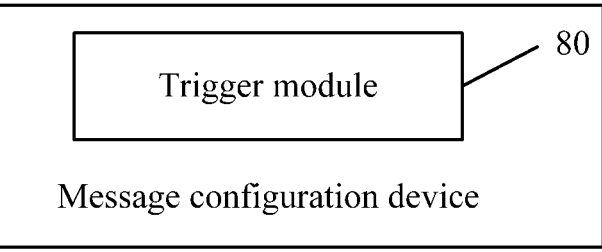
FIG. 8 is a structural block diagram of a message configuration device according to an embodiment of the present disclosure.

FIG. 8 is a structural block diagram of a message configuration device according to an embodiment of the present disclosure, as shown in FIG. 8, the message configuration device includes a trigger module 80. The trigger module 80 is configured to trigger a random access procedure through a physical downlink control channel (PDCCH) order, where the PDCCH order includes at least one of: indication information that a reporting function of channel quality information in a message 3 of the random access procedure is enabled or disabled; a type of the channel quality information reported in the message 3; or a carrier or a carrier index corresponding to the channel quality information reported in the message 3.

Through the above modules, the random access procedure is triggered through the physical downlink control channel (PDCCH) order, and the PDCCH order includes at least one of: the indication information that the reporting function of the channel quality information in the message 3 of the random access procedure is enabled or disabled; the type of the channel quality information reported in the message 3; or the carrier or the carrier index corresponding to the channel quality information reported in the message 3.

Embodiment 10

This embodiment further provides a message sending device. The message sending device is applied to a terminal and used for implementing the above embodiments and optional implementation modes, and the description of the device that has been already made is omitted. The term "module" as used below; may implement a combination of at least one of software and hardware with a predetermined function. While the device described in following embodiments is preferably implemented in software, implementations of hardware, or a combination of software and hardware, are also possible and contemplated.

Figure 9:
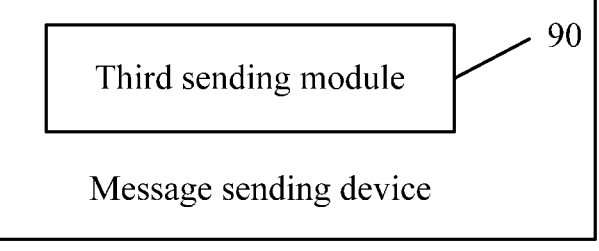
FIG. 9 is yet another structural block diagram of a message sending device according to an embodiment of the present disclosure.

FIG. 9 is yet another structural block diagram of a message sending device according to an embodiment of the present disclosure, as shown in FIG. 9, the message sending device includes a third sending module 90. The third sending module 90 is configured to send fourth information in a message 3 in a random access procedure, where the fourth information includes channel quality information, the terminal selects a first transport block size from transport block sizes supported by the message 3, and the first transport block size is used for a message 3 that carries the channel quality information.

Through the above modules, the terminal sends the fourth information in the message 3 in the random access procedure, the fourth information includes the channel quality information, and the terminal selects the first transport block size from the transport block sizes supported by the message 3, and the first transport block size is used for the message 3 that carries the channel quality information.

In the embodiments of the present disclosure, the transport block sizes supported by the message 3 further include a second transport block size, where the second transport block size is used for a message 3 that does not carry the channel quality information.

In the embodiments of the present disclosure, when a first condition is satisfied, a type of the channel quality information included in the fourth information is a channel quality indicator (CQI), where the first condition includes that a number of retransmission times of a control channel is less than or equal to a threshold; where the threshold is configured by a base station and sent to the terminal, or is configured by default.

In the embodiments of the present disclosure, when a second condition is satisfied, a type of the channel quality information included in the fourth information includes one of: a CQI and a number of retransmission times of a control channel; a CQI and an aggregation level of a control channel; a CQI, a number of retransmission times of a control channel, and an aggregation level of the control channel; a CQI and a number of retransmission times of a downlink data channel; a number of retransmission times of a control channel; an aggregation level of a control channel; a number of retransmission times of a control channel and an aggregation level of the control channel; or a number of retransmission times of a downlink data channel.

In the embodiments of the present disclosure, the second condition includes that the number of retransmission times of the control channel is greater than or equal to a threshold; where the threshold is configured by a base station and sent to the terminal, or is configured by default.

Embodiment 11

This embodiment further provides a message configuration device. The message configuration device is applied to a base station and used for implementing the above embodiments and optional implementation modes, and the description of the device that has been already made is omitted. The term "module" as used below; may implement a combination of at least one of software and hardware with a predetermined function. While the device described in following embodiments is preferably implemented in software, implementations of hardware, or a combination of software and hardware, are also possible and contemplated.

Figure 10:
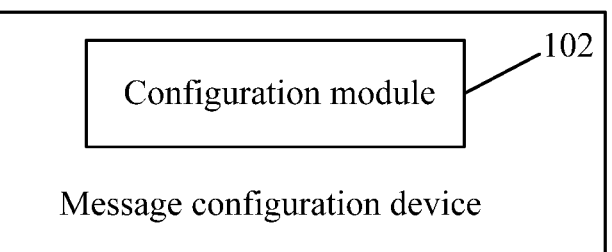
FIG. 10 is another structural block diagram of a message configuration device according to an embodiment of the present disclosure.

FIG. 10 is another structural block diagram of a message configuration device according to an embodiment of the present disclosure, as shown in FIG. 10, the message configuration device includes a configuration module 102. The configuration module 102 is configured to configure a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information.

It should be noted that each of the above-described modules may be implemented in software or hardware. For the latter, it may be implemented in following manners, but is not limited to this: all of the above-described modules are located in a same processor; or, each of the above modules is located in different processors in any combination.

The above technical solutions are described below in connection with optical embodiments.

Optional Embodiment 1

In a NB-IoT system, a base station configures resources occupied by a narrowband physical random access channel (NPRACH). The resources occupied by the NPRACH are divided into: (1) NPRACH resources allocated for a contention-based random access procedure; (2) NPRACH resources allocated for a non-contention based random access procedure. Moreover, the NPRACH resources allocated for the contention-based random access procedure in (1) are also divided into: (a) NPRACH resources which carry an uplink data allocation (also known as early data transmission (EDT)) in a Msg3; and (b) NPRACH resources which do not carry the uplink data allocation in the Msg3.

Two types of the Msg3 are defined: a type 1: the Msg3 carries uplink data; or a type 2: the Msg3 does not carry the uplink data.

In this embodiment, channel quality information is carried in the Msg3.

A terminal selects a NPRACH resource to send a preamble. In this embodiment, when the type of the Msg3 indicated by the NPRACH resource selected by the terminal is the type 1, and a type of the channel quality information is at least one of a number of retransmission times and an aggregation level of a narrowband physical downlink control channel (NPDCCH).

Further, at least one of the number of retransmission times and the aggregation level of the NPDCCH needs to satisfy a condition that a BLER is less than or equal to 1%.

A carrier corresponding to the channel quality information is configured by the base station or is a carrier configured by default.

When the carrier corresponding to the channel quality information is the carrier configured by default, the carrier configured by default is a carrier used for Msg2 transmission.

When the carrier corresponding to the channel quality information included in first information is configured by the base station, a number of carriers configured by the base station is at least 1.

Further, other carriers except the carrier used for the Msg2 transmission are configured by the base station, and the carrier used for the Msg2 transmission is in default configuration.

Optional Embodiment 2

In a NB-IoT system, a base station configures resources occupied by a NPRACH. The resources occupied by the NPRACH are divided into: (1) NPRACH resources allocated for a contention-based random access procedure; (2) NPRACH resources allocated for a non-contention based random access procedure. Moreover, the NPRACH resources allocated for the contention-based random access procedure in (1) are also divided into: (a) NPRACH resources which carry an uplink data allocation (also known as EDT) in a Msg3; and (b) NPRACH resources which do not carry the uplink data allocation in the Msg3.

Two types of the Msg3 are defined; a type 1: the Msg3 carries uplink data; or a type 2: the Msg3 does not carry the uplink data.

In this embodiment, channel quality information is carried in the Msg3.

A terminal selects a NPRACH resource to send a preamble. In this embodiment, when the type of the Msg3 indicated by the NPRACH resource selected by the terminal is the type 2, the terminal determines, according to a format of the Msg3, at least one of: a type of the channel quality information; or a carrier corresponding to the channel quality information. The type of the channel quality information is at least one of a number of retransmission times and an aggregation level of a NPDCCH.

Further, at least one of the number of retransmission times and the aggregation level of the NPDCCH needs to satisfy a condition that a BLER is less than or equal to 1%.

The carrier corresponding to the channel quality information is configured by the base station or is a carrier configured by default.

When the carrier corresponding to the channel quality information is the carrier configured by default, the carrier configured by default is a carrier used for Msg2 transmission.

When the carrier corresponding to the channel quality information included in first information is configured by the base station, a number of carriers configured by the base station is at least 1.

Further, other carriers except the carrier used for the Msg2 transmission are configured by the base station, and the carrier used for the Msg2 transmission is configured by default.

When the format of the Msg3 is the RRC ConnectionRequest, the type of the channel quality information is at least one of a number of retransmission times and an aggregation level of a narrowband physical downlink control channel (NPDCCH).

The carrier corresponding to the channel quality information is configured by the base station or configured by default.

Further, at least one of the number of retransmission times and the aggregation level of the NPDCCH needs to satisfy a condition that a BLER is less than or equal to 1%.

The carrier corresponding to the channel quality information is configured by the base station or is a carrier configured by default.

When the carrier corresponding to the channel quality information is the carrier configured by default, the carrier configured by default is a carrier used for Msg2 transmission.

When the carrier corresponding to the channel quality information included in first information is configured by the base station, a number of carriers configured by the base station is at least 1.

Further, other carriers except the carrier used for the Msg2 transmission are configured by the base station, and the carrier used for the Msg2 transmission is configured by default.

When the format of the Msg3 is the RRC ConnectionResumeRequest or the RRC ConnectionReestablishmentRequest, the type of the channel quality information is a number of retransmission times and an aggregation level of a NPDCCH, and the carrier corresponding to the channel quality information is a carrier used for Msg2 transmission by default:

Further, at least one of the number of retransmission times and the aggregation level of the NPDCCH needs to satisfy a condition that a BLER is less than or equal to 1%.

Optional Embodiment 3

In one MTC system, a base station triggers a contention-based random access procedure by sending a PDCCH order. The PDCCH order is a sending format of a DCI and is used for triggering a random access procedure. The PDCCH order may trigger a contention-based random access procedure or trigger a non-contention based random access procedure.

The PDCCH order includes at least one of:

(1) indication information that channel quality information reported in a Msg3 is enabled or disabled;

(2) a type of the channel quality information reported in the Msg3; or (3) a carrier or a carrier index corresponding to the channel quality information reported in the Msg3.

In this embodiment, "the carrier or carrier index corresponding to the channel quality information reported in the Msg 3" indicated in the PDCCH order is an interval between the carrier index corresponding to the channel quality information and a carrier where the PDCCH order is located upon sending the PDCCH order. For example, when "the carrier or carrier index corresponding to the channel quality information reported in the Msg 3" indicated in the PDCCH order is "+1", it represents that the carrier index corresponding to the channel quality information=the carrier index where the PDCCH order is located upon sending the PDCCH order+1; when "the carrier or carrier index corresponding to the channel quality information reported in the Msg 3" indicated in the PDCCH order is "−1", it represents that the carrier index corresponding to the channel quality information=the carrier index where the PDCCH order is located upon sending the PDCCH order−1.

In this embodiment, the type of the channel quality information reported in the Msg3 is a number of retransmission times and an aggregation level of a control channel. In the MTC system, the number of retransmission times of the control channel is selected from {1, 2, 4, 8, 16, 32, 64, 128, 256}. Resources occupied by the control channel consist of N enhanced control channel elements (ECCEs), where N is selected from {8, 16, 24}. A value of the channel quality information reported in the Msg3 has a corresponding relationship with the number of retransmission times and the aggregation level of the control channel.

In this embodiment, the value of the channel quality information reported in the Msg3 is indicated by 4 bits, and the reported number of retransmission times and the reported aggregation level of the control channel are obtained by looking up a table 1. For example, when the value of the channel quality information reported in the Msg3 is 3, it represents that the number of retransmission times of the control channel is 1, and the aggregation level is 24 ECCEs.

TABLE 1

| Value reported in Msg3 | a number of retransmission times of a control channel | aggregation level |
| --- | --- | --- |
| 0 | not reported | not reported |
| 1 | 1 | 8 ECCEs |
| 2 | 1 | 16 ECCEs |
| 3 | 1 | 24 ECCEs |
| 4 | 2 | 24 ECCEs |
| 5 | 4 | 24 ECCEs |
| 6 | 8 | 24 ECCEs |
| 7 | 16 | 24 ECCEs |
| 8 | 32 | 24 ECCEs |
| 9 | 64 | 24 ECCEs |
| 10 | 128 | 24 ECCEs |
| 11 | 256 | 24 ECCEs |

Optional Embodiment 4

In a NB-IoT system, paging information may be sent on multiple carriers. When the paging information is not sent, a base station also sends a narrowband reference signal (NRS), so that a terminal may measure a channel quality by using the NRS sent by the base station and determine whether to stop the detection of subsequent paging information/a wake up signal (WUS) in advance according to the measured channel quality, and therefore, the present disclosure provides an NRS sending method.

The terminal determines a first paging Occasion (PO) at least according to the N, and the terminal detects the NRS at a first PO; where N is a positive integer greater than 1.

Further, the terminal obtains an value of N according to signaling, where the signaling is a high-level signaling.

Further, the step in which the terminal determines the first PO at least according to N includes that: the first PO is a second PO with an interval of N−1, where the second PO is a PO corresponding to the terminal.

Further, for a terminal configured with extended Discontinuous Reception (eDRX), the first PO at least includes a first PO in the eDRX.

Further, the step in which the terminal detects the NRS at the first PO includes that the terminal starts to detect the NRS in first K sub-frames of a search space of the control channel, or the terminal starts to detect the NRS in first L sub-frames of a search space of the WUS, where K and L are positive integers larger than 0.

Optional Embodiment 5

In a NB-IoT system, paging information may be sent on multiple carriers. When the paging information is not sent, a base station also sends a NRS, so that a terminal may measure a channel quality by using the NRS sent by the base station and determine whether to stop the detection of subsequent paging information/a wake up signal (WUS) in advance according to the measured channel quality, and therefore, the present disclosure provides an NRS sending method.

The base station configures N and sends the NRS, where N is a positive integer greater than 1.

Further, the step in which the base station sends the NRS includes that the base station determines a first Discontinuous Reception (DRX) cycle in which the NRS is located according to N, and the base station sends the NRS before all paging occasions (POs) within the first DRX cycle.

Further, the first DRX cycle includes that a DRX cycle in which a DRX cycle index modulo N is a fixed value B.

Further, the step in which the base station sends the NRS further includes that: the base station starts to send the NRS in first K sub-frames of a search space of a control channel, and ends in M sub-frames after the control channel ends, where K and M are positive integers greater than or equal to 0.

Further, the step in which the base station sends the NRS further includes that: the base station starts to send the NRS in first L sub-frames in a WUS search space, and ends in H sub-frames after the WUS ends, where L and H are positive integers greater than or equal to 0.

Further, the step in which the base station sends the NRS further includes that: the base station sends the NRS at least before the first PO corresponding to an extended discontinuous reception (eDRX) terminal.

Embodiment 12

An embodiment of the present disclosure further provides a storage medium. The storage medium includes a stored program, and the program described above is configured to, when executed, perform any of the methods described above.

In this embodiment, the storage medium described above may be configured to store a program code for performing following steps.

In S1, a terminal sends first information in a message 3 in a random access procedure, where the first information includes channel quality information; and the terminal determines second information according to a type of the message 3.

In this embodiment, the storage medium described above may be configured to store a program code for performing following steps.

In S2, a terminal sends third information in a message 3 in a random access procedure, where the third information includes channel quality information, and the random access procedure is a contention-based random access procedure triggered by a physical downlink control channel (PDCCH) order.

In this embodiment, the storage medium described above may be configured to store a program code for performing following steps.

In S3, a base station triggers a random access procedure through a physical downlink control channel (PDCCH) order, where the PDCCH order includes at least one of: indication information that a reporting function of channel quality information in a message 3 of the random access procedure is enabled or disabled; a type of the channel quality information reported in the message 3; or a carrier or a carrier index corresponding to the channel quality information reported in the message 3.

In this embodiment, the storage medium described above may be configured to store a program code for performing following steps.

In S4, a terminal sends fourth information in a message 3 in a random access procedure, where the fourth information includes channel quality information, the terminal selects a first transport block size from transport block sizes supported by the message 3, and the first transport block size is used for a message 3 that carries the channel quality information.

In this embodiment, the storage medium described above may be configured to store a program code for performing following steps.

In S5, a base station configures a transport block size for a message 3 in a random access procedure, where the transport block size includes a first transport block size and a second transport block size, the first transport block size is used for a message 3 that carries channel quality information, and the second transport block size is used for a message 3 that does not carry the channel quality information.

In this embodiment, the storage medium described above may include, but is not limited to, a variety of media that may store a program code, such as a USB flash disk, a ROM, a RAM, a removable disk, a magnetic disk, or an optical disk.

In an embodiment, specific examples in this embodiment may be referred to as examples described in the above embodiments and optional implementation modes, which are not described in detail in this embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices. In an embodiment, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. A message sending method, comprising:

selecting, by a terminal, a narrowband physical random access channel (NPRACH) resource to send a preamble;

determining, by the terminal, a type of a message 3 indicated by the NPRACH resource selected by the terminal;

sending, by the terminal, first information in the message 3 in a random access procedure, wherein the first information comprises channel quality information; and determining, by the terminal, second information according to the message 3;

wherein determining the type of the message 3 indicated by the NPRACH resource selected by the terminal comprises:

determining, by the terminal, the type of the message 3 is a type 1 in a case where the message 3 carries uplink data and independently allocated NPRACH resources; and determining, by the terminal, the type of the message 3 is a type 2 in a case where the message 3 does not carry the uplink data and carries the independently allocated NPRACH resources;

wherein in a case where the message 3 is the type 1, determining, by the terminal, the second information according to the message 3 comprises:

determining the second information comprises one of: a number of retransmission times of a control channel, an aggregation level of a control channel, a number of retransmission times of a downlink data channel, or a carrier corresponding to the channel quality information; and in a case where the message 3 is the type 2, determining, by the terminal, the second information according to the message 3 comprises:

determining, by the terminal, the second information according to a format of the message 3, wherein in a case where the format of the message 3 is a radio resource control (RRC) connection resume request or an RRC connection reestablishment request, the second information at least comprises one of: a number of retransmission times of a control channel, an aggregation level of a control channel, a number of retransmission times of a downlink data channel, or a carrier corresponding to the channel quality information.

2. The method of claim 1, wherein the carrier corresponding to the channel quality information is configured by a base station, the carrier corresponding to the channel quality information is a carrier configured by default, or the carrier corresponding to the channel quality information is selected according to a first principle.

3. The method of claim 2, wherein the carrier corresponding to the channel quality information being selected according to the first principle, comprises:

selecting M carriers from a first set as the carrier corresponding to the channel quality information, wherein the first set comprises at least one carrier, and the at least one carrier in the first set satisfies: the at least one carrier in the first set is a carrier among carriers in a second set and with channel quality information greater than or equal to a threshold, wherein the threshold is configured by the base station or is configured by default, and M is a positive integer.

4. The method of claim 3, wherein the carriers in the second set are configured by the base station or determined by the terminal.

5. The method of claim 1, wherein the carrier corresponding to the channel quality information is a carrier used for transmitting random access response information.

6. The method of claim 1, further comprising:

sending, by a terminal, third information in a message 3 in a random access procedure, wherein the third information comprises channel quality information, and the random access procedure is a contention-based random access procedure triggered by a physical downlink control channel (PDCCH) order.

7. The method of claim 6, wherein the PDCCH order comprises at least one of:

indication information for the third information enabling or disabling a reporting function of the channel quality information;

a type of the channel quality information; or a carrier or a carrier index corresponding to the channel quality information.

8. The method of claim 7, wherein the carrier corresponding to the channel quality information is a carrier where the PDCCH order is located upon sending the PDCCH order.

9. The method of claim 7, wherein the carrier or the carrier index corresponding to the channel quality information is an interval between the carrier index corresponding to the channel quality information and a carrier index where the PDCCH order is located upon sending the PDCCH order.

10. A message sending device, applied to a terminal, comprising:

a processor and a memory storing processor-executable instructions which, when executed by the processor, are configured to implement the method of claim 1.

11. A message configuration method, comprising:

configuring, by a base station, resources occupied by a narrowband physical random access channel (NPRACH);

triggering, by the base station, a random access procedure through a type of channel quality information reported in a message 3;

receiving, by the base station, first information in the message 3 in the random access procedure, wherein the first information comprises channel quality information; and configuring, by the base station, a carrier corresponding to the channel quality information in the first information, wherein the type of the channel quality information reported in the message 3 is determined by:

the type of the message 3 is determined as a type 1 in a case where the message 3 carries uplink data and independently allocated NPRACH resources; and the type of the message 3 is determined as a type 2 in a case where the message 3 does not carry the uplink data and carries the independently allocated NPRACH resources.

12. The method of claim 1, further comprising:

sending, by a terminal, fourth information in a message 3 in a random access procedure, wherein the fourth information comprises channel quality information, the terminal selects a first transport block size from transport block sizes supported by the message 3, and the first transport block size is used for a message 3 that carries the channel quality information.

13. The method of claim 12, wherein the transport block sizes supported by the message 3 further comprise a second transport block size, wherein the second transport block size is used for a message 3 that does not carry the channel quality information.

14. The method of claim 12, wherein in a case where a first condition is satisfied, a type of the channel quality information comprised in the fourth information is a channel quality indicator (CQI), wherein the first condition comprises that a number of retransmission times of a control channel is less than or equal to a threshold:

wherein the threshold is configured by a base station and sent to the terminal, or is configured by default.

15. The method of claim 12, wherein in a case where a second condition is satisfied, a type of the channel quality information comprised in the fourth information comprises one of:

a CQI and a number of retransmission times of a control channel;

a CQI and an aggregation level of a control channel;

a CQI, a number of retransmission times of a control channel, and an aggregation level of the control channel;

a CQI and a number of retransmission times of a downlink data channel;

a number of retransmission times of a control channel;

an aggregation level of a control channel;

a number of retransmission times of a control channel and an aggregation level of the control channel; or a number of retransmission times of a downlink data channel;

wherein the second condition comprises that the number of retransmission times of the control channel is greater than or equal to a threshold;

wherein the threshold is configured by a base station and sent to the terminal, or is configured by default.

16. The method of claim 11, further comprising:

configuring, by a base station, a transport block size for a message 3 in a random access procedure, wherein the transport block size comprises a first transport block size and a second transport block size, the first transport block size is used for a message 3 that carries channel quality information, and the second transport block size is used for a message 3 that does not carry the channel quality information.

17. A message configuration device, applied to a base station, comprising:

a processor and a memory storing processor-executable instructions which, when executed by the processor, are configured to implement the method of claim 11.

\* \* \* \* \*